United States Patent [19]
Morin

[11] 3,882,913
[45] May 13, 1975

[54] METHOD FOR DELIMBING FELLED TREES

[75] Inventor: Benoit L. Morin, Hornepayne, Ontario, Canada

[73] Assignee: Morard Pulpwood Company Limited, Hornepayne, Ontario, Canada

[22] Filed: Mar. 4, 1974

[21] Appl. No.: 447,776

Related U.S. Application Data

[62] Division of Ser. No. 259,013, June 2, 1972, Pat. No. 3,805,858.

[52] U.S. Cl. ........................................... 144/309 AC
[51] Int. Cl. ............................................. A01g 23/00
[58] Field of Search .............. 144/2 Z, 3 D, 309 AC

[56] References Cited
UNITED STATES PATENTS
3,464,468  9/1969  Thompson et al. .................. 144/3 D
FOREIGN PATENTS OR APPLICATIONS
243,992  10/1969  U.S.S.R. ............................. 144/2 Z
220,668  11/1968  U.S.S.R. ............................. 144/2 Z Primary Examiner—Gerald A. Dost

[57] ABSTRACT

The trunks of a cluster of felled trees are arranged on a first beam extending generally horizontally from the rear of a vehicle. The first beam has an elongated knife therealong to provide a cutting edge. A second beam having a series of arcuate knives therealong to provide a comb-like array of cutting edges is supported by a rigid arm from a standard affixed to the rear of the vehicle. The second beam is lowered and jockeyed to spread the trunks of the cluster over the first beam and locate different trunks between different teeth of the comb-like array. The cutting edges generally surround the trunks so that the trunks are delimbed as they are simultaneously dragged lengthwise past the cutting edges by cables attached to the butts of individual trunks. The cables are wound onto a winch affixed to the rear of a second vehicle. After the major portions of the trunks have been delimbed a saw is translated lengthwise of the beams to cut off the tops of the trunks.

4 Claims, 8 Drawing Figures

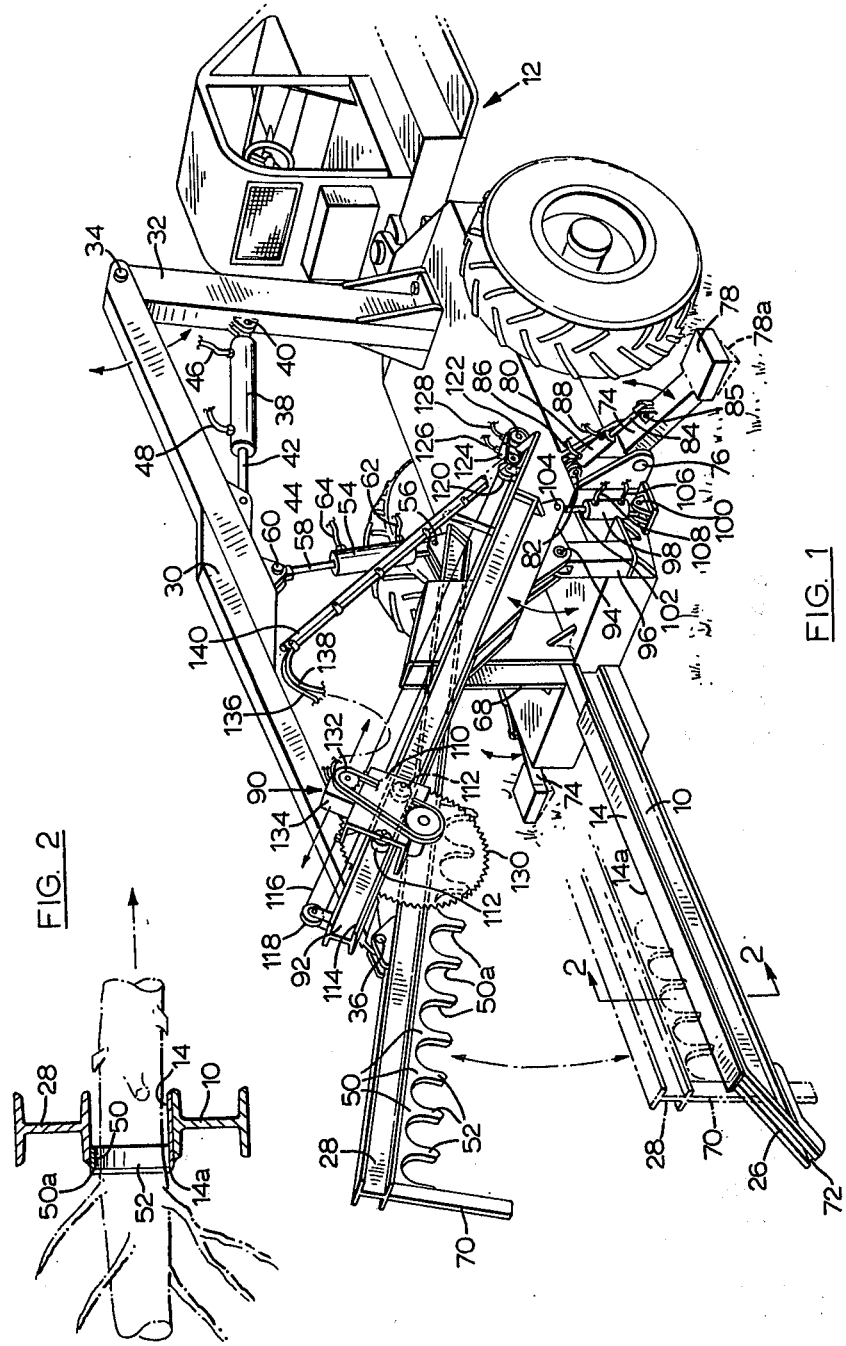

METHOD FOR DELIMBING FELLED TREES

CROSS-REFERENCE TO RELATED APPLICATION

This application is a division of U.S. application Ser. No. 259,013 filed June 2, 1972, and now U.S. Pat. No. 3,805,858.

BACKGROUND OF THE INVENTION

1. Field of the Invention

The present invention relates to a method for delimbing felled trees. The method is suitable for use in the logging industry.

2. Description of the Prior Art

Machines and methods have been developed for use in the logging industry to harvest trees in a continuous operation. Such machines and methods are efficient but usually they are expensive and can be afforded only by the larger logging companies. Many smaller logging companies fell trees using ordinary power saws and need a simple and inexpensive method for delimbing the felled trees.

SUMMARY OF THE INVENTION

A plurality of felled trees can be delimbed by simultaneously moving the trunks of such trees lengthwise between beams which are brought together and furnish an array of cutting edges which generally surround and delimb the moving trunks.

BRIEF DESCRIPTION OF THE DRAWINGS

A preferred apparatus for carrying out the method of the invention is illustrated in the drawings wherein the same reference numerals indicate the same elements throughout and:

FIG. 1 is a perspective of apparatus for delimbing felled trees showing, in solid lines, a beam in a raised position and, in broken lines, the beam in a lowered position;

FIG. 2 is a section along the line 2—2 of FIG. 1 taken with said beam in the lowered position and showing, in broken lines, a felled tree which has been partially delimbed;

DESCRIPTION OF THE PREFERRED EMBODIMENT

Apparatus as shown in FIG. 1 can be used to delimb felled trees. A first beam 10 provides a rigid support on which the trunks of felled trees can be arranged. The first beam 10 is affixed to and protrudes generally horizontally from the rear of a vehicle 12. Although a variety of vehicles would be suitable, the particular vehicle illustrated in FIG. 1 is of the type generally known in the logging industry as a "timber-jack." An elongated knife 14 is affixed to the first beam 10 and provides a cutting edge 14a therealong, this edge pointing generally horizontally, normal to the beam, as best seen in FIGS. 2 and 8.

Figure 3:
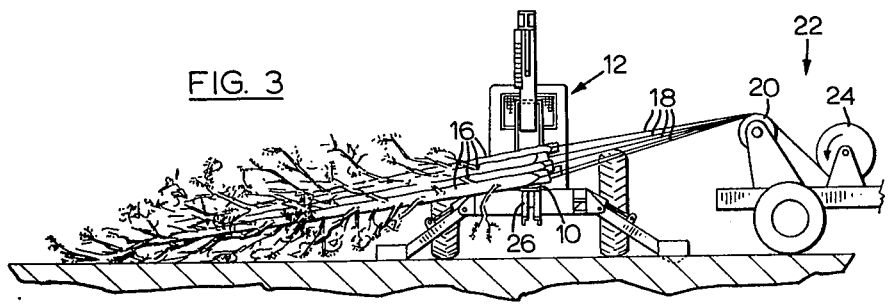
FIG. 3 is a rear elevation showing part of the apparatus of FIG. 1 during one stage of the delimbing operation but not showing the saw and related apparatus which are not used during this stage.

Initially, as shown in FIG. 3, the trunks 16 of a plurality of felled trees are arranged in a cluster on the first beam 10 by dragging them lengthwise onto the first beam 10 by means of a plurality of cables 18 each of which is attached at one end to the butt of an individual trunk 16. Each of the cables 18 passes over a pulley 20 supported from the rear of a second vehicle 22 and is attached at the other end to a winch 24 affixed to the rear of the second vehicle 22. Although again a variety of vehicles would be suitable, the particular vehicle partially illustrated in FIG. 3 is another "timber-jack." The trunks 16 are dragged onto the first beam 10 as the cables 18 are wound onto the winch 24. The protruding end 26 of the first beam 10 slopes downwardly (FIG. 1) so that the arranging of the trunks 16 on the first beam 10 can be facilitated by moving the vehicle 12 rearwardly to insert the protruding end 26 under the trunks 16 and thereby cause them to slide up the sloping surface onto the first beam 10.

Figure 4:
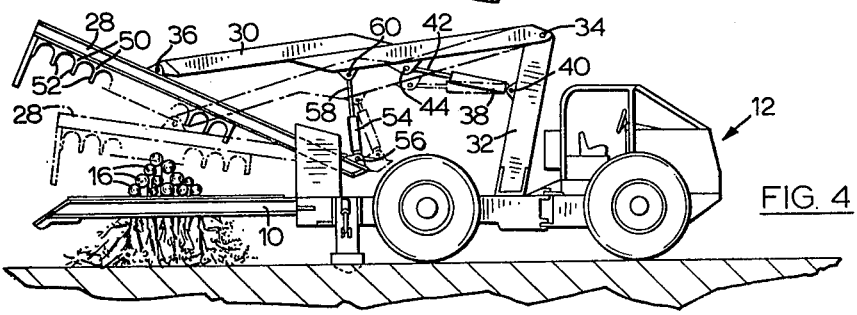
FIG. 4 is a side elevation showing the apparatus of FIG. 3 during a subsequent stage of the delimbing operation and showing part of this apparatus, in solid lines, in a raised position and, in broken lines, in a lower position.

After the trunks 16 have been arranged in a cluster on the first beam 10, a second beam 28 is lowered (FIG. 4) to spread the trunks 16 of the cluster over the first beam 10. The second beam 28 is supported by a rigid arm 30 from a standard 32 affixed to the rear of the vehicle 12 and is movable in a generally vertical plane. The arm 30 is pivotally connected at one end to the top of the standard 32 by a pivot 34 and at the other end to the second beam 28, at a position intermediate the ends of the second beam 28, by a pivot 36. The second beam 28 is raised or lowered in a vertical plane by pivoting the arm 30 about the pivot 34. This pivoting is controlled by an air compression cylinder 38 pivotally connected at one end to the standard 32 by a pivot 40 and a piston rod 42 extending from the other end of the cylinder 38 and pivotally connected to the arm 30 by a pivot 44. Air hoses 46 and 48 (FIG. 1) lead from the cylinder 38 to an air compressor (not shown).

Figure 5:
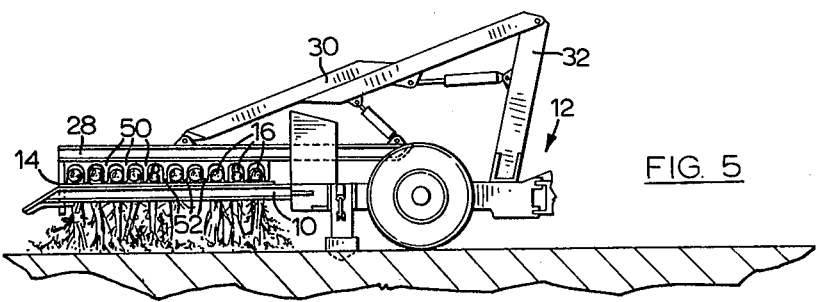
FIG. 5 is a side elevation, partly broken away, showing most of the apparatus of FIG. 3 during a subsequent stage of the delimbing operation.
Figure 8:
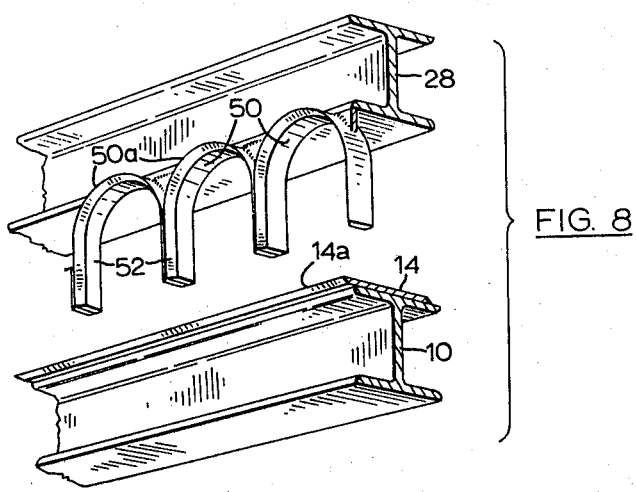
FIG. 8 is an enlarged perspective of part of the apparatus.

A series of arcuate knives 50 is affixed to the second beam 28 and provides a comb-like array of cutting edges 50a therealong, these edges pointing generally normal to the second beam as best seen in FIGS. 2 and 8. Adjacent ends of adjoining arcuate knives 50 are joined together to form a series of straight teeth 52 which protrude generally normal to the second beam 28 as best seen in FIG. 8. When the second beam 28 is lowered to spread the trunks 16 of the cluster over the first beam 10, different trunks 16 are located between different teeth 52. It is not necessary that only one trunk 16 be located between any particular pair of adjacent teeth 52 and generally more than one trunk 16 will be located between some or all of the pairs of adjacent teeth 52 as shown in FIG. 5. Also, there may be some pairs of adjacent teeth 52 which have no trunks 16 located between them.

To facilitate the spreading and locating of the trunks 16 as described above, the second beam 28 is jockeyed (FIG. 4) relative to the first beam 10 by pivoting the second beam 28 back and forth about the pivot 36. This pivoting is controlled by an air compression cylinder 54 pivotally connected at one end to one end of the second beam 28 by a pivot 56 and a piston rod 58 extending from the other end of the cylinder 54 and pivotally connected to the arm 30 by a pivot 60. Air hoses 62 and 64 (FIG. 1) lead from the cylinder 54 to an air compressor (not shown). Preferably the second beam 28 is jockeyed relative to the first beam 10 as the second beam 28 is lowered to bring the beams 10 and 28 together.

FIG. 5 shows the final arrangement of the trunks 16 on the first beam 10 between the teeth 52 after the second beam 28 has been lowered and jockeyed as described above. At this stage only the butts of the trunks 16 rest on the first beam 10 and no limbs have been removed. The teeth 52 rest on the knife 14 and the cutting edges 14a and 50a completely surround the trunks 16. This can best be seen in FIG. 2 where the trunk shown in broken lines has been partially delimbed. However it is not absolutely necessary that the cutting edges 14a and 50a completely surround the trunks 16 and it is sufficient that they generally surround the trunks 16 so that the knife 14 and the bottoms of the teeth 52 are close enough together to prevent limbs from passing therebetween.

Figure 6:
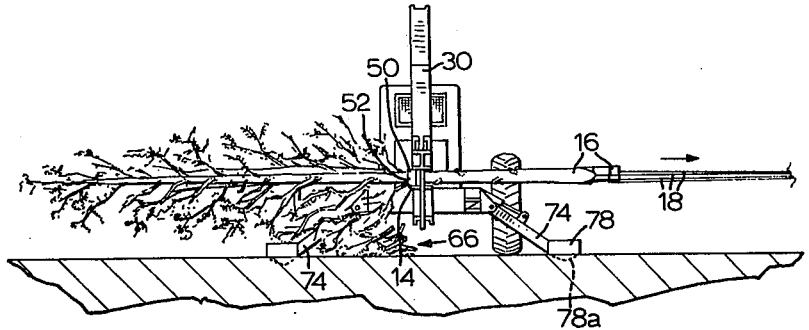
FIG. 6 is a rear elevation showing the apparatus of FIG. 3 during a subsequent stage of the delimbing operation.

Thus, in FIG. 5, different trunks are located in different passageways between the beams, said passageways having peripheral cutting edges around different ones of the trunks. After the butts of the trunks 16 have been arranged as shown in FIG. 5 the trunks 16 are simultaneously moved lengthwise between the beams 10 and 28 past the cutting edges 14a and 50a. As shown in FIG. 6 this is accomplished by again dragging the trunks 16 by means of the cables 18. As the trunks 16 are dragged past the cutting edges 14a and 50a the limbs encounter the cutting edges and are sheared off, falling to the ground in a pile 66.

To restrain sidewise movement of the second beam 28 during this stage of the delimbing operation there is a vertical guideway 68 (FIG. 1) affixed to the rear of the vehicle 12 into and through which one end of the second beam 28 extends and, at the other end of the second beam 28, there is affixed a bar 70 (FIG. 1) which fits into a slot 72 in the protruding end 26 of the first beam 10 when the beams 10 and 28 are brought together. Sidewise movement of the vehicle 12 during this stage of the delimbing operation is prevented by braces 74 (FIG. 1) which are located on either side of the vehicle 12 at the rear. One end of each brace 74 is pivotally connected to the vehicle 12 by a pivot 76 and, to ensure firm engagement with the ground, the other end 78 has one or more cleats 78a. To ensure a good bracing effect the cleated end 78 of each brace 74 is pressed firmly against the ground by means of an air compression cylinder 80 pivotally connected at one end to the rear of the vehicle 12 by a pivot 82 and a piston rod 84 extending from the other end of the cylinder 80 and pivotally connected to the brace 74 by a pivot 85. Air hoses 86 and 88 lead from each cylinder 80 to an air compressor (not shown).

Figure 7:
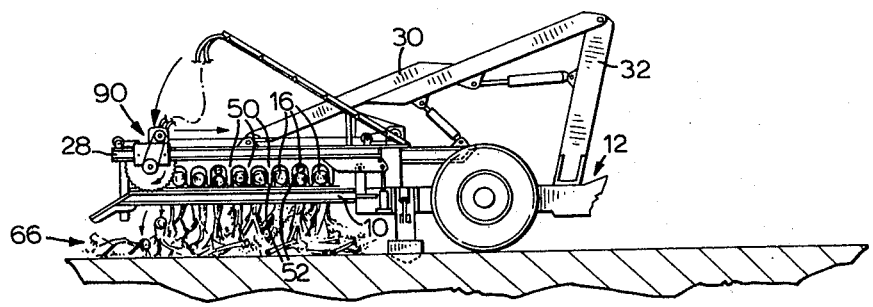
FIG. 7 is a side elevation, partly broken away, showing most of the apparatus of FIG. 3 and also the saw and related apparatus of FIG. 1 during the final stage of the operation.

After the major portions of the trunks 16 have been delimbed, a saw 90 is translated lengthwise of the beams 10 and 28 to cut off the tops of the trunks 16 as shown in FIG. 7. The tops of the trunks 16 fall into the pile 66 and are not dragged past the cutting edges 14a and 50a. The saw 90 is mounted on a third beam 92 (FIG. 1) pivotally connected near one end by a pivot 94 to a post 96 affixed to the rear of the vehicle 12. The third beam 92 is raised and lowered about the pivot 94 by an air compression cylinder 98 pivotally connected to the rear of the vehicle 12 by a pivot 100 and a piston rod 102 extending from the other end of the cylinder 98 and pivotally connected to the end of the third beam 92 nearest the post 96 by a pivot 104. Air hoses 106 and 108 lead from the cylinder 98 to an air compressor (not shown). During the initial stages of the delimbing operation the third beam 92 is maintained in a raised position (FIG. 1) to prevent the saw 90 and the third beam 92 from interfering with the delimbing of the trunks 16. However when the major portions of the trunks 16 have been delimbed the third beam 92 is lowered until it is parallel to and alongside the second beam 28 (FIG. 7). The saw 90 is mounted on the third beam 92 by means of a mount 110 (FIG. 1) and rollers 112 which are journalled in the mount 110 and travel on a flange 114 of the third beam 92 which is an I-beam. A cable 116 attached at each end to the mount 110 passes around an idler pulley 118 mounted on the free end of the third beam 92 and around a pulley 120 mounted on the other end of the third beam 92. The pulley 120 is driven by a sprocket and chain drive 122 from an air motor 124 affixed to the third beam 92. Air hoses 126 and 128 lead from the motor 124 to an air compressor (not shown). As the pulley 120 turns the saw 90 is translated along the third beam 92, running on rollers 112. The saw 90 has a circular blade 130 driven by a sprocket and chain drive 132 from an air motor 134. Air hoses 136 and 138 lead from the motor 134 to a mast 140 fixed to the third beam 92 at a position near the motor 124. The air hoses 136 and 138 are supported along the mast 140 and lead from the bottom of the mast 140 to an air compressor (not shown). The top of the mast 140 is supported above the third beam 92 sufficiently far to allow the free portions of the air hoses 136 and 138 to reach from the top of the mast 140 to either end of the third beam 92.

I claim:

1. A method of delimbing felled trees, comprising locating a plurality of trunks of felled trees transversely of a first beam, lowering a second beam towards the first beam to spread the trunks over the first beam and form between the beams a plurality of side by side passageways having peripheral cutting edges around different ones of the trunks, and then moving said trunks lengthwise through the passageways between the beams thus causing limbs on the trunks to be severed by the cutting edges.

2. A method as claimed in claim 1, wherein said cutting edges comprise an elongated cutting edge on the first beam and a rigid comb-like array of cutting edges on the second beam, and the second beam is jockeyed relative to the first beam to facilitate the spreading of the trunks and the locating of different trunks between different teeth of the comb-like array.

3. A method as claimed in claim 1, wherein the trunks are pulled by cables attached to their butts, and the first beam is projected under the trunks adjacent their butts so that the attached cables can be used to pull the trunks between the beams.

4. A method as claimed in claim 3, wherein after the major portions of the trunks have been pulled past the cutting edges of the tops of the trunks are not pulled past the cutting edges but are cut off by operating a saw lengthwise of the beams.

\* \* \* \* \*